United States Patent

[11] 3,614,732

| | | |
|---|---|---|
| [72] | Inventor | Daniel Lejeune<br>Clermont-Ferrand, France |
| [21] | Appl. No. | 834,353 |
| [22] | Filed | June 18, 1969 |
| [45] | Patented | Oct. 19, 1971 |
| [73] | Assignee | Compagnie Generale des Establissements<br>Michelin, raison sociale Michelin & Cie<br>France |
| [32] | Priority | June 21, 1968 |
| [33] | | France |
| [31] | | 156203 |

[54] TRANSMISSION OF INFORMATION BETWEEN ELEMENTS IN RELATIVE MOTION
10 Claims, 7 Drawing Figs.

[52] U.S. Cl. ....................................... 340/58,
116/34, 200/61.25, 331/65, 340/57
[51] Int. Cl. ........................................ B60c 23/02
[50] Field of Search............................ 340/58, 57,
213, 152 TR, 196, 258 C, 258 R, 280; 200/61.22,
61.23, 61.25; 116/34; 74/146.5, 146.4, 146.3,
146.2; 331/65

[56] References Cited
UNITED STATES PATENTS

| 2,422,542 | 6/1947 | Gustafsson .................. | 340/258 C |
| 3,344,629 | 10/1967 | Burney ...................... | 70/280 |
| 2,070,743 | 2/1937 | McDonnell................... | 73/146.5 |
| 3,215,978 | 11/1965 | Brown et al.................. | 340/58 |
| 3,374,460 | 3/1968 | Massoubre ................... | 340/58 |

OTHER REFERENCES

Harper; Charles A., Electronic Packaging With Resins, pg. 2, New York, 1961, TK 7870 H28.

The Institute of Printed Circuits, How to Design and Specify Printed Circuits, pg. 57, Chicago, received by Scientific Library Apr. 17, 1959, TK 7870 I16.

Ristenbatt & Riddle, Transistor Physics and Circuits, 2nd ed., pg. 424, Figure 14- 15, Englewood Cliffs, N.J., 1966, TK 7872 T73R53.

Primary Examiner—Donald J. Yusko
Assistant Examiner—Glen R. Swann, III
Attorney—Brumbaugh, Graves, Donohue & Raymond ABSTRACT: A driver is apprised, while driving, of an abnormal temperature or pressure in any of the tires of an automobile A receiver oscillator, mounted on the automobile frame near each tire, contains two inductors so arranged that the oscillator is normally blocked. A pair of inductors, associated with each tire and moving therewith, are arranged in series with a normally open switch, which is closed in response to the condition to be monitored. When this switch is closed, the passing of these latter inductors near those of the receiver oscillator causes it to become unblocked, thus producing a signal to warn the driver of the abnormal condition.

PATENTED OCT 19 1971 3,614,732

INVENTOR
DANIEL LEJEUNE
BY
Brumbaugh Graves Donohue & Raymond
his ATTORNEYS

TRANSMISSION OF INFORMATION BETWEEN ELEMENTS IN RELATIVE MOTION

BACKGROUND OF THE INVENTION

This invention relates to improvements in devices for transmitting information without mechanical connection or electrical connection by wire, between two elements in relative motion, for example a moving element and a fixed element, when the emitter carried, for example, by the moving element, passes near the receiver carried by the other element. More specifically, the invention concerns the case in which the moving element is a rotating body, for example a vehicle wheel, while the fixed element is a structure, for example the frame of the vehicle, in relation to which the moving element rotates. In even greater detail, the invention relates to a deflation and heating indicator for tires whereby the driver of a vehicle can be warned, while driving, of some abnormal condition in one of the tires of the vehicle.

Devices for the transmission of information between moving and fixed elements and indeed tire deflation indicators, not making use of any physical connection for the transmission of information, are known. A recent and interesting example thereof is disclosed in French Pat. No. 1,399,657 of Michelin & Cie. In the device described in this patent, the fixed element supports two magnetically coupled coils the coupling of which facilitates the maintenance of oscillations of an oscillator, and the moving element supports a coil which on each revolution passes between the two fixed coils, forming a shield and interrupting the coupling between them when the circuit of which the coil is a part is closed. An interruption of the oscillations of the oscillator carried by the fixed element is an indication that the circuit of which the moving element coil is a part is closed.

This device, which is useful as a deflation indicator and constitutes a considerable advance in relation to previous devices, nevertheless has certain disadvantages. For one thing, it is comparatively complicated and difficult to install properly, especially as regards the detection of an interruption of oscillations. Furthermore, its sensitivity depends upon the relative speed of the moving element, i.e., the speed of rotation of the wheel in relation to the frame. Beyond a certain speed, the shielding effect produced is too short to be detected easily. Another disadvantage is that the clearance between the moving coil and the fixed coils at the time of passing of the moving coil between the fixed coils should be comparatively small and constant.

SUMMARY OF THE INVENTION

An object of the present invention is to remedy the shortcomings of prior art devices noted above. In particular, an object of the invention is to provide a transmitter-receiver system of extremely simple design that is inexpensive to manufacture and reliable in operation that has an improved sensitivity that is practically independent of speed. Another object of the invention is to provide a tire-monitoring device that can be used at little cost to improve the safety of fast vehicles by indicating to the driver while in motion any abnormal conditions related to any one of the tires.

The foregoing and other objects are attained in accordance with the invention by the provision on one of the elements, for example the fixed element, of a receiving assembly and, on the other element, of an emitter circuit. The receiving assembly comprises an oscillator having in its oscillating circuit two magnetically coupled inductances. The direction of winding of the inductance coils, the connections thereof, and relative position of the coils in space are chosen in such a manner that the oscillator is blocked; it would oscillate if one reversed on one of the inductance coils and the direction of the coil winding, the terminal leads, or the pole positions. The emitter circuit is normally open and must be closed in order for a signal to be transmitted. The emitter circuit comprises two inductances in series and with parallel axes, arranged in such a manner that the path followed by the circuit traverses the two windings in different directions of rotations.

In the simplest case, the oscillating circuit of the receiver assembly comprises two identical coils or inductors (i.e., having the same manufacturing characteristics including the same direction of winding). They are connected in parallel, the input terminal of one and the output terminal of the other being at the same potential. The same effect of blocking of the oscillator circuit is obtained by inverting at the same time any two of the following characteristics: the direction of winding, the position in space, the connection. The purpose is to give to the mutual induction coefficient of the two oscillator coils an algebraic value the modulus or absolute value of which permits oscillation but the algebraic sign of which prevents it due to an assembly which would be considered defective if functioning of the oscillator were desired.

In the absence of any outside interference, the oscillator of the receiving assembly is blocked in that the manner of assembly of the two coils prevents oscillation. The same is true if the emitter circuit comes close to the two coils in question and, being open, cannot conduct current. On the other hand, if the emitter circuit is closed and is near the oscillation circuit, a modification of the coupling between the coils of the oscillator circuit of the receiver assembly is produced. The emitter circuit is coupled with the receiver circuit, so that a current is induced in the emitter circuit by the relative motion. This results in a modification of the mutual induction coefficient between the coils of the receiver. Specifically, the algebraic sign of the induction coefficient between the receiver coils changes. Oscillation can then occur, during a long or very short period. Depending on conditions, a series of oscillations or only one alternation or even a fraction of an alternation will be produced. It will then be sufficient to detect this oscillation train or oscillation or fraction of an oscillation, which is comparatively simple.

In practice, it is generally preferable to mount the emitter circuit, which does not have to be fed by a source of current, on the moving element: for example, on the wheel in case of a deflation or heating-indicating device for tires.

The invention comprises also the special design of the emitter circuit and of the oscillator circuit of the receiver assembly, the detection, the transmission, and the use of the information, specifically for monitoring the tires of a vehicle.

The emitter circuit is preferably obtained by means of the printed circuit technique. In such case, the inductors forming the active part of the circuit comprise plane metal spirals placed next to each other on one of the surfaces or on opposite surfaces of an insulating base. The emitter circuit may be mounted on a plate of a few millimeters thickness and a few square centimeters surface area. The emitter circuit further comprises a circuit breaker or normally open switch which may be, for example, a pressure contactor or a thermocontactor the closing of which may be obtained by any suitable means and which activates the emitter circuit. In the case of a tire deflation warning device, the pressure contactor is connected, on the one hand, to the tire value by means of a flexible or rigid tube and, on the other hand, to the base of the printed circuit.

The oscillator of the receiver assembly is preferably a transistor oscillator, for example, of the common emitter type, comprising in the transistor base circuit an inductor and a capacitor in series, in parallel with a polarized resistor, and, in the collector circuit, a second identical inductor which is coupled with the former inductor so as to block the oscillator, in the absence of an unblocking action by the emitter circuit, the emitter of the transistor being grounded.

The oscillations of the oscillator may be detected by an impedance adapter and a Darlington-type commutator for actuating a signal circuit. A feeder circuit of the receiver assembly may be used to transmit the output signal, thus reducing the number of connections between the signal circuit and the receiver circuit.

In case of a tire-monitoring device, one can thus use a receiver assembly comprising an oscillator and an adaptor-commutator placed in the vicinity of each wheel. This assembly can be imbedded in some insulating substance, attached mechanically and electrically to the frame and connected with a single-wire conductor to a common central feeding and signalling assembly for all of the wheels.

In another embodiment of the invention, an adaptor-commutator common to several or all wheels is used, and in another embodiment a receiver assembly common to several wheels is used, whereby the elements mounted adjacent to each wheel are reduced to an oscillator in the former case and to a pair of coils in the latter case. However, the number of wires are then increased and anti-interference devices (especially armored and coaxial conductors) are needed.

It is advisable to feed the oscillator and the adapter-commutator a voltage which is rendered constant by means of a voltage regulator device, such as a Zener diode and its associated resistance or a sufficiently high resistance.

The signalling, for example in the form of a light indicator or tone signal, may be obtained by means including a semiconductor memory circuit or time delay circuit ensuring persistance of the light or sound signal.

BRIEF DESCRIPTION OF THE DRAWING

An understanding of additional aspects of the invention may be gained from a consideration of the following detailed description of a representative embodiment thereof, in conjunction with the appended figures of the drawing, wherein.

DESCRIPTION OF THE PREFERRED EMBODIMENT

Figure 1:
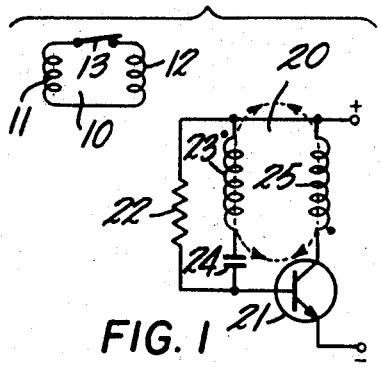
FIGS. 1 and 2 are schematic diagrams of a moving emitter circuit and a fixed oscillator in accordance with the invention, the emitter circuit being at a distance and without influence on the oscillator in FIG. 1 and close to and acting on the oscillator in FIG. 2.
Figure 2:
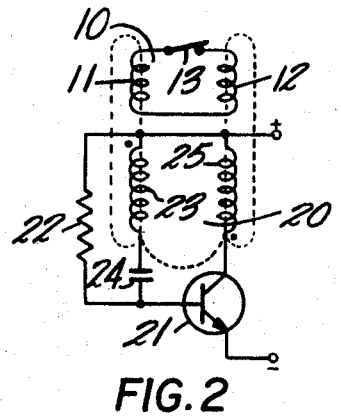

FIGS. 1 and 2 illustrate the principle of the invention.

An emitter or transmitter circuit 10 comprises two inductors 11 and 12 connected in series and a switch 13 that is normally open and that can be closed by operation of a sensing means (a pressure contactor, for example) not shown.

An oscillator 20 comprises a transistor 21, the emitter of which is connected to the negative pole or to ground, the base of the transistor being polarized by a resistor 22 installed in parallel with an inductor 23 and a capacitor 24. The transistor collector is connected to an inductor 25 that is coupled in parallel with the inductor 23. The parallel inductors 23 and 25 are identical (same direction of winding) and physically close to one another. However, the input terminal of each of them, indicated in the figures by a dot, is placed opposite the output terminal of the other one, so that the fields generated by the inductors 23 and 25 are in opposition, as shown by the arrows in FIG. 1.

In the case shown in FIG. 1, the emitter circuit 10 being at a distance from the oscillator 20, it cannot act on the oscillator regardless of whether the circuit breaker or switch 13 is opened or closed. The result is a blocking of the oscillator 20 due to the "faulty" installation of the inductances 23 and 25.

In the case shown in FIG. 2, the emitter circuit 10 being in the vicinity of the oscillator 20 and the circuit breaker or switch 13 being closed, the emitter circuit cuts the magnetic lines of the inductors 23 and 25 and a current flows in the inductors 11 and 12. In accordance with the invention, the inductors 11 and 12 are connected to each other in such a manner as to break the equilibrium of the opposing fields generated by the coils 23 and 25. The magnetic circuit thus closed modifies the flux between the coils 23 and 25 and unblocks the oscillator. The result is the same as if the characteristics of the inductors 23 and 25 were modified in a manner giving their mutual induction coefficient a sign facilitating the generation of oscillations.

Figure 3:
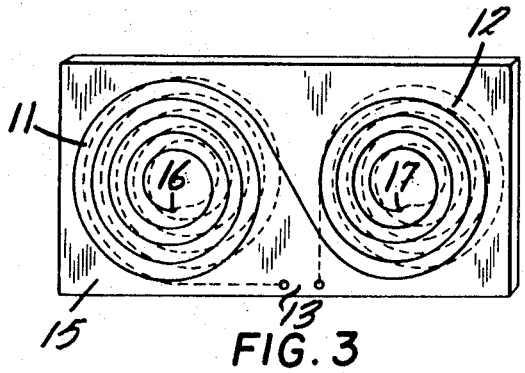
FIG. 3 is a perspective view of a plate comprising a printed emitter circuit according to the invention for mounting on a vehicle wheel.

FIG. 3 shows a representative embodiment of an emitter circuit 10 in accordance with the invention. The inductors 11 and 12 comprise metal spirals placed on an insulating plate 15 on either side. The windings are shown in full line on the visible surface and in broken lines on the other surface. The groups of turns are connected at 16 and 17 through the insulating plate. As may be seen, the windings of the two inductors run in inverse direction if the circuit is followed from terminal to terminal of the circuit breaker 13 (clockwise on the left and counterclockwise on the right if one begins at the left terminal; vice versa if one begins at the right terminal). The two surfaces of the plate may be imbedded in some insulating protective substance. The plate may also be made integral with the sensor of the physical characteristic to be monitored (pressure contact for deformation or thermocontact for expansion, for example, ensuring the closing of the circuit breaker or switch 13).

Figure 4:
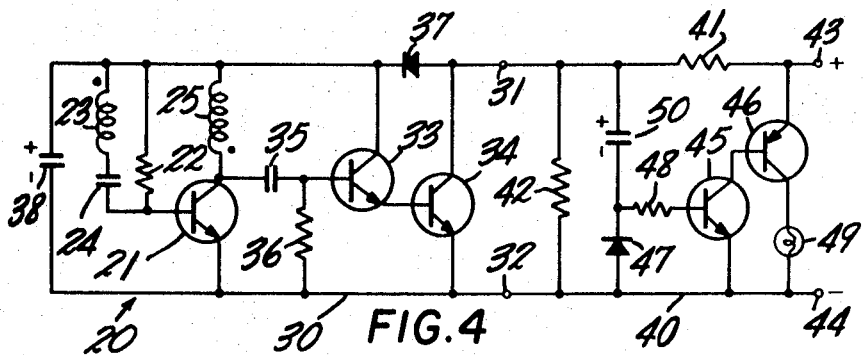
FIG. 4 is a schematic view of a general wiring diagram of a detector-signaller assembly according to the invention

FIG. 4 is a diagram of a complete receiver-signalling assembly.

The oscillator 20 with its transistor 21 and inductors 23 and 25, as shown in FIGS. 1 and 2, is part of an oscillator-adapter-commutator or amplifier-switching combination 30 connected by its terminals 31 and 32 to a feeder and signal circuit combination 40.

The oscillator 20 is coupled with an impedance compensator and commutator of the Darlington type, formed by two transistors 33 and 34, through a capacitor 35 and a resistor 36. On passing of an oscillation train, the transistor 34 becomes conductive and supplies a voltage to the signalling assembly 40.

In order to ensure a continuous feed of the oscillator 20 and the Darlington assembly, a diode 37 and a storage capacitor 38 are used. The feeder circuit comprises a divider bridge formed by the resistors between the terminals 31 and 32 making it possible to deliver a substantially constant voltage, for example, of 4 volts, from a voltage source. The positive terminal 43 can be connected, for example, to the positive pole of the battery of an automotive vehicle, and the negative terminal 44 (as well as the terminal 32) to ground, for example the frame of the vehicle.

The signal circuit comprises two transistors 45 and 46. The base of the transistor 45 is connected to the negative pole by means of an isolator diode 47 and a resistance 48. The collector is connected to the base of the power transistor 46. The latter has its emitter connected to the positive pole and its collector to a signal device, for example a light indicator 49. The circuit also comprises a memory (storage) condenser 50 which prolongs the operation of the power transistor 46, in such a manner as to maintain the operation of the signalling device 49 for a sufficient time between two oscillation trains emitted by the detecting assembly 20.

It is possible to replace the transistors 45 and 46 by a thyristor with its deactivating system. However, this more complicated possibility implies the intervention of a driver in order to stop the operation of the signalling device 49.

Figure 5:
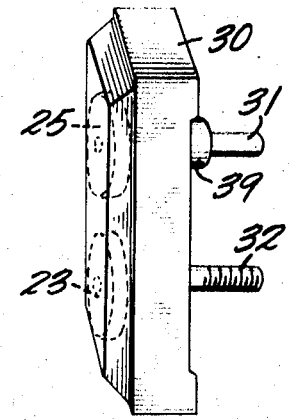
FIG. 5 is a perspective view of an oscillator-adapter assembly according to the invention for mounting in the vicinity of a vehicle wheel.

FIG. 5 shows an oscillator-compensator-commutator assembly 30 as it may be assembled for application in tire monitoring. The terminal 31 is in the form of a pin for a connecting plug. The terminal 32 is provided with a threading which facilitates both the attachment of the assembly 30 to the frame and the grounding. The coils 23 and 25 of the oscillator are indicated by dotted lines. The other components of the assembly 30, which are now shown, are imbedded in an insulating protective block. The block is extended by an insulating collar 39 around the pin 31, the collar being molded integrally with the block, insulating the pin 31 from ground, and facilitating holding the assembly 30 in place by being fitted in a suitable bore provided on the support (not shown) of the assembly.

Figure 6:
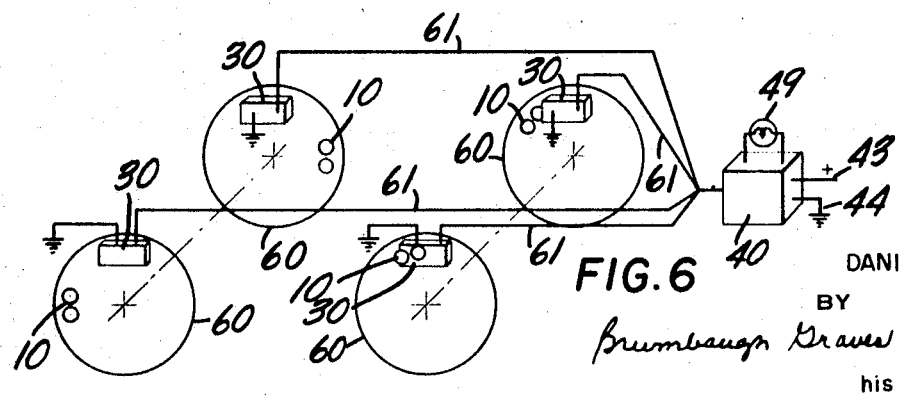
FIG. 6 is a schematic diagram of the entire installation ensuring the monitoring of all four wheels of an automotive vehicle.

FIG. 6 is a diagram of an assembly of monitoring devices for vehicle tires.

The four vehicle wheels are represented by circles 60, each of the wheels comprising an emitter circuit 10 such as shown in FIG. 3.

On the frame and opposite each wheel is attached a receiver assembly 30 such as shown in FIGS. 4 and 4. The various receivers 30 are connected to ground, and by means of the single-wire conductors 61, to a signalling assembly 40. The assembly 40 is constructed as indicated in FIG. 4. It is provided with a warning device 49 under the observation of the driver.

Figure 7:
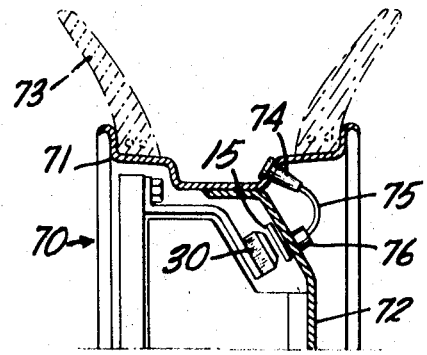
FIG. 7 is a fragmentary sectional elevation of a wheel equipped with an emitter and the corresponding receiver block attached to the frame.

FIG. 7 is a cross section of a wheel. The wheel 70 comprises a rim 71 and disk 72 and is equipped with a tire 73. The inflation valve 74 of the tire or its inner tube is connected by means of a flexible lead 75 to a sensor 76 attached to the plate 15 carrying an emitter circuit 10 such as the one shown in FIG. 3. Close to the coils of the plate 15 is the assembly 30, which is attached to the frame.

Various tests have been undertaken with a device such as the one described above. The characteristics of the inductances were as follows:

Inductances 23 and 25: coils of 2,300 turns of enameled copper wire of 0.1 mm. diameter; interior diameter: 6 mm. outside diameter: 24 mm. thickness: 3.5 mm. resistance: 240 ohms.

Inductances 11 and 12: double face printed circuit of 50 mm. over 25 mm. each inductance comprising eight flat turns on each surface.

The device functions satisfactorily if the distance between the path of the emitter inductances 11 and 12, on the one hand, and the receiver inductances 23 and 25, on the other hand, ranges between 4 to 5 mm. and 10 mm. The effectiveness is not influenced by vibrations, exposure to and deposits of mud or water, the wheel movements or the speed of the vehicle even if very high. The cost of manufacture and installation is very modest, as will be understood easily.

Even though the preceding description refers in great detail to the preferred embodiment, it goes without saying that the invention is not limited to the special provisions indicated but that it encompasses all embodiments thereof within the scope of the appended claims.

I claim:

1. Detection apparatus for the detection of a condition of interest and the transmission, without physical connection, of information relating thereto between two elements in relative motion, comprising: (a) receiver circuit means on one of said elements, said receiver means comprising an oscillator with two magnetically coupled inductors, the direction of winding of the inductors, the connections of the inductors, and their relative positions in space being such that the oscillator is normally blocked while it oscillates if there is reversed on one of the inductors the direction of winding, the connections, or the pole positions; (b) emitter circuit means on the other of said elements, said emitter circuit means being normally open and comprising two inductors connected in series, mounted with their axes parallel and having their windings coiled so that current flowing therethrough turns in opposite directions in the two series inductors; and (c) sensor means for closing said normally open emitter circuit means in response to a condition to be detected, whereby said emitter circuit means is placed in condition to unblock the oscillator, said receiver circuit means and said emitter circuit means being mounted so that they are alternately relatively far from and relatively close to each other, transmission of information being made when said receiver circuit means and said emitter circuit means are relatively close to each other.

2. Apparatus according to claim 1 wherein the emitter circuit means comprises a base plate of insulating material and conductive plane spirals mounted side by side on the baseplate, the spiral windings ending at spaced terminals.

3. Apparatus according to claim 1 wherein the oscillator comprises a transistor, a series-mounted inductor and capacitor, a polarization resistor in parallel with the series-mounted inductor and capacitor, the series-mounted inductor and capacitor and polarization resistor being in the transistor base circuit, and a second inductor in the transistor collector circuit and coupled to the series-mounted inductor so as to block oscillations while the emitter circuit means is open.

4. Apparatus according to claim 3 further comprising signal means for signalling the detected condition and amplifier and switching means connecting said oscillator to said signal means.

5. Apparatus according to claim 4 further comprising a block of insulating material for mounting circuit means including the oscillator and amplifier and switching means, a lead extending from the block to the signal means, a first pin mounted on the block for connecting the lead to the block-mounted circuit means, and a second pin mounted on the block for grounding the block-mounted circuit means and for attaching the block to said one of said elements, said block of insulating material being mounted so that the relative motion between said two elements brings said emitter circuit means and said oscillator relatively far from and relatively close to each other.

6. Apparatus according to claim 4 further comprising delay means for prolonging the actuating of the signal means so that the signal means generates a continuous output notwithstanding intermittent unblocking of the oscillator by the emitter means.

7. Apparatus according to claim 1 further comprising a vehicle and a pneumatic tire mounted thereon, the sensor means and emitter circuit means being mounted for movement with the tire and the receiver means being stationary with respect to the vehicle.

8. Apparatus according to claim 7 wherein the sensor means is pressure responsive and closes the emitter circuit means in response to abnormal pressure within the tire.

9. Apparatus according to claim 7 wherein the sensor means is temperature responsive and closes the emitter circuit means in response to abnormal temperature of the tire.

10. Apparatus for monitoring the tires of an automotive vehicle and apprising the vehicle operator of a predetermined abnormal condition of any of the monitored tires, comprising separate sensor means operatively associated with each tire to be monitored, separate emitter circuit means operatively associated with each sensor means, each sensor-emitter assembly moving with the associated tire-wheel assembly, separate receiver circuit means operatively associated with each emitter circuit means, the receiver circuit means being mounted on the frame of the vehicle adjacent to the paths respectively followed by the emitter circuit means when the vehicle is in operation, a single signal circuit responsive to actuation of any of the receiver circuit means, and a signal device responsive to actuation of the signal circuit and mounted in such a manner that, when it is actuated, it alerts the operator to an abnormal condition of one of the vehicle tires, (a) each receiver circuit means comprising a block of insulating material, an oscillator with two magnetically coupled inductors mounted on said block of insulating material, the direction of winding of the inductors, the connections of the inductors, and their relative positions in space being such that the oscillator is normally blocked while it oscillates if there is reversed on one of the inductors the direction of winding, the connections, or the pole positions, a lead extending from the block to the signal circuit, a first pin mounted on the block for connecting the lead to the oscillator, and a second pin mounted on the block for grounding the oscillator and attaching the block to the vehicle frame; (b) each emitter circuit means being normally open and comprising a base plate of insulating material, two inductors connected in series and mounted on said base plate with their axes parallel and having their windings coiled side by side in a plane so that current flowing therethrough turns in opposite directions in the two series inductors, the coiled windings ending at spaced-apart terminals; and (c) each sensor closing the normally open emitter circuit means associated therewith by connecting said spaced-apart terminals in response to the predetermined abnormal condition of the tire monitored thereby; whereby the development of the predetermined abnormal condition in any of the monitored tires is sensed by the sensor means associated therewith, which closes the emitter circuit means associated therewith by connecting the terminals thereof, which unblocks the oscillator of the receiver circuit means associated therewith, which actuates the signal circuit, which actuates the signal device, which apprises the vehicle operator of the abnormal condition.